United States Patent
Cheng et al.

(10) Patent No.: US 11,728,502 B2
(45) Date of Patent: Aug. 15, 2023

(54) ELECTROLYTE REPLENISHMENT METHOD FOR MOLTEN CARBONATE FUEL CELL STACK

(71) Applicant: HUANENG CLEAN ENERGY RESEARCH INSTITUTE, Beijing (CN)

(72) Inventors: Jian Cheng, Beijing (CN); Ruiyun Zhang, Beijing (CN); Chengzhuang Lu, Beijing (CN); Hao Li, Beijing (CN); Shisen Xu, Beijing (CN); Baomin Wang, Beijing (CN); Guanjun Yang, Beijing (CN)

(73) Assignee: HUANENG CLEAN ENERGY RESEARCH INSTITUTE, Beijing (CN)

(*) Notice: Subject to any disclaimer, the term of this patent is extended or adjusted under 35 U.S.C. 154(b) by 13 days.

(21) Appl. No.: 17/512,293

(22) Filed: Oct. 27, 2021

(65) Prior Publication Data

US 2022/0052369 A1     Feb. 17, 2022

Related U.S. Application Data

(63) Continuation of application No. PCT/CN2020/121292, filed on Oct. 15, 2020.

(30) Foreign Application Priority Data

Dec. 3, 2019 (CN) .......................... 201911223026.1

(51) Int. Cl.
*H01M 8/14* (2006.01)
*H01M 8/2457* (2016.01)
*H01M 8/04276* (2016.01)

(52) U.S. Cl.
CPC ....... *H01M 8/145* (2013.01); *H01M 8/04276* (2013.01); *H01M 8/2457* (2016.02); *H01M 2008/147* (2013.01)

(58) Field of Classification Search
None
See application file for complete search history.

(56) References Cited

U.S. PATENT DOCUMENTS

| | | | | |
|---|---|---|---|---|
| 5,468,573 A | * | 11/1995 | Bregoli | H01M 8/04283 429/464 |
| 2006/0257722 A1 | * | 11/2006 | Hilmi | H01M 8/145 429/535 |
| 2006/0269830 A1 | * | 11/2006 | Johnsen | H01M 8/144 429/442 |

OTHER PUBLICATIONS

WIPO, International Search Report for International Application No. PCT/CN2020/121292, dated Jan. 20, 2021.

\* cited by examiner

*Primary Examiner* — Lucas J. O'Donnell
(74) *Attorney, Agent, or Firm* — Hodgson Russ LLP

(57) ABSTRACT

A method for replenishing an electrolyte of a molten carbonate fuel cell stack includes: preparing an electrolyte colloidal solution containing 10% to 20% of the electrolyte and having a viscosity of 200 to 800 Pa·s; replenishing the electrolyte of the cell stack using the electrolyte colloidal solution prepared in step 1 to allow the electrolyte to adhere to an electrode and an internal channel of the cell stack; discharging excess electrolyte colloidal solution in the cell stack; and drying and discharging water or an organic solvent in the cell stack under an inert gas condition to complete replenishment of the electrolyte of the cell stack, and performing a discharge performance test.

6 Claims, 1 Drawing Sheet

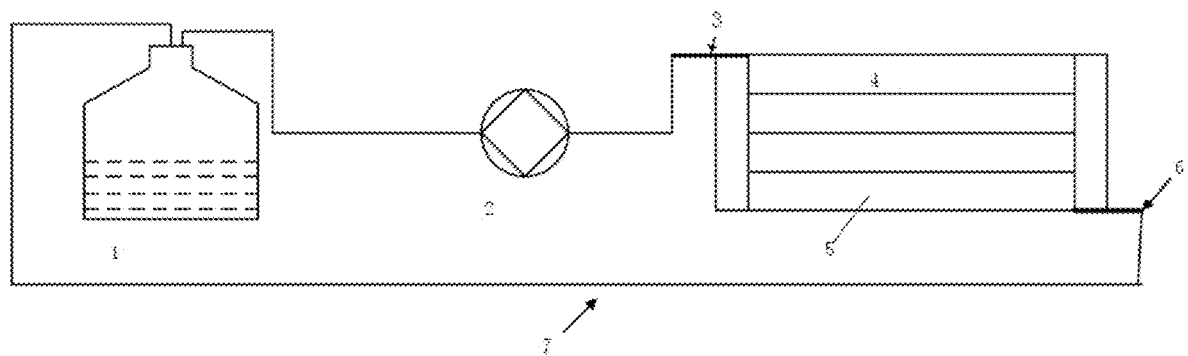

ELECTROLYTE REPLENISHMENT METHOD FOR MOLTEN CARBONATE FUEL CELL STACK

CROSS-REFERENCE TO RELATED APPLICATIONS

This Application is a continuation of International Application No. PCT/CN2020/121292, filed Oct. 15, 2020, which claims priority to, and the benefits of, Chinese Patent Application No. 201911223026.1, filed Dec. 3, 2019, the entire contents of which are incorporated by reference herein.

FIELD

The present disclosure relates to the field of molten carbonate fuel cell technology, and more particularly to a method for replenishing an electrolyte of a molten carbonate fuel cell stack.

BACKGROUND

A fuel cell is a power generation device that directly converts chemical energy of fuel into electrical energy through an electrochemical reaction without combustion. Since the reaction process of the fuel cell does not involve combustion, the energy conversion efficiency is not limited by the "Carnot Cycle" and as high as 50% to 60%. During the operation of the fuel cell, hydrogen or other fuel is input to an anode, and electrochemical reactions, such as oxidation of the hydrogen or other fuel and reduction of oxygen, occur at interfaces of electrodes and the electrolyte to generate a current and output electric energy. Compared to thermal power generation, the power generation process of the fuel cell does not include direct combustion of the fuel, and has extremely low emission of $CO$, $CO_2$, $SO_2$, $NO_X$ and unburned hazardous substances, which is recognized as the fourth power generation manner besides thermal power generation, hydro power generation and nuclear power generation. Therefore, the fuel cell is a new power source with high efficiency and clean features, which integrates energy, chemical, material and automatic control technologies.

Molten carbonate fuel cell operates at 650° C., and has advantages as follows: (a) the operating temperature is high, and activation energy of electrode reactions is low, such that a high-efficiency catalyst is not needed no matter the oxidation of hydrogen or the reduction of oxygen, which saves precious metals, and reduces costs to a certain extent; (b) fuel gas having a high content of CO may be used, such as coal gas; (c) a temperature of waste heat discharged by the fuel cell may be as high as 673 K, which may be used for bottom circulation or be recycled to improve a total efficiency to 80%. Therefore, the molten carbonate fuel cell has a broad application prospect on fixed power stations and distributed power stations.

The molten carbonate fuel cell is composed of key components such as electrodes, electrolyte separators, carbonate sheets, and bipolar plates. The electrolyte separator and the carbonate sheet are sintered together during the operation of the cell stack, and the molten carbonate penetrates into micro-pores of the sintered electrolyte separator by capillary action, thereby blocking gas and conducting carbonate ions. The electrolyte separator needs to be able to store the molten carbonate electrolyte of the cell for a long time. However, in the actual operation of the cell stack, the electrolyte is easy to lose, which greatly affects the life and stable operation of the cell stack. The loss of the electrolyte is generally due to corrosion reactions with metal elements, and the evaporation and migration of electrolyte. The loss of the electrolyte leads to the increase of internal resistance of the cell and coarse-porosity of the electrolyte separator, thereby reducing the retention of the electrolyte and accelerating the loss of the electrolyte. Therefore, in order to ensure long life and stable operation of the molten carbonate fuel cell stack, an electrolyte replenishment technology may be used during the operation of the cell stack to prolong the service life of the molten carbonate fuel cell and increase the competitiveness of molten carbonate fuel cell power generation technology.

SUMMARY

The present disclosure provides a method for replenishing an electrolyte of a molten carbonate fuel cell stack, which includes:

step 1: preparing an electrolyte colloidal solution containing 10% to 20% of the electrolyte and having a viscosity of 200 to 800 Pa·s;

step 2: replenishing the electrolyte of the cell stack using the electrolyte colloidal solution prepared in step 1 to allow the electrolyte to adhere to an electrode and an internal channel of the cell stack;

step 3: discharging excess electrolyte colloidal solution in the cell stack; and step 4: drying and discharging water or an organic solvent in the cell stack under an inert gas condition to complete replenishment of the electrolyte of the cell stack, and performing a discharge performance test.

BRIEF DESCRIPTION OF THE DRAWINGS

FIG. 1 is a schematic diagram showing an electrolyte replenishing loop device according to the present disclosure.

REFERENCE NUMERALS

1: container containing an electrolyte colloidal solution; 2: circulating pump; 3: anode or cathode inlet; 4: cell; 5: molten carbonate fuel cell; 6: anode or cathode outlet; 7: circulation pipeline.

DETAILED DESCRIPTION

In the following, the present disclosure will be described in detail with reference to the drawings.

An object of the present disclosure is to provide a method for replenishing an electrolyte of a molten carbonate fuel cell stack, which solves the problem of electrolyte loss in the existing molten carbonate fuel cell stack, and greatly improves the life and operation stability of the cell stack.

In order to achieve the above-mentioned object, the technical solutions adopted in the present disclosure are as follows.

The present disclosure provides a method for replenishing an electrolyte of a molten carbonate fuel cell stack, which includes:

step 1: preparing an electrolyte colloidal solution containing 10% to 20% of the electrolyte and having a viscosity of 200 to 800 Pa·s;

step 2: replenishing the electrolyte of the cell stack using the electrolyte colloidal solution prepared in step 1 to allow the electrolyte to adhere to an electrode and an internal channel of the cell stack;

step 3: discharging excess electrolyte colloidal solution in the cell stack; and step 4: drying and discharging water or an organic solvent in the cell stack under an inert gas condition to complete replenishment of the electrolyte of the cell stack, and performing a discharge performance test.

In an embodiment of the present disclosure, the electrolyte colloidal solution in step 1 is prepared by:

mixing lithium carbonate and potassium carbonate in a molar ratio of 62:38 to form the electrolyte; and mixing the obtained electrolyte with an aqueous solution of polyvinyl alcohol with a concentration of 0.5% to 3%, or with a mixed solution of polyvinyl butyral and ethanol with a concentration of 95% to prepare the electrolyte colloidal solution containing 10% to 20% of the electrolyte and having the viscosity of 200 to 800 Pa·s.

In an embodiment of the present disclosure, the electrolyte colloidal solution in step 1 is prepared by:

mixing lithium carbonate and sodium carbonate in a molar ratio of 53:47 to form the electrolyte; and mixing the obtained electrolyte with an aqueous solution of polyvinyl alcohol with a concentration of 0.5% to 3%, or with a mixed solution of polyvinyl butyral and ethanol with a concentration of 95% to prepare the electrolyte colloidal solution containing 10% to 20% of the electrolyte and having the viscosity of 200 to 800 Pa·s.

In an embodiment of the present disclosure, in step 2, replenishing the electrolyte of the cell stack using the electrolyte colloidal solution prepared in step 1 includes:

forming a circulation loop for replenishing the electrolyte by an anode or cathode inlet of the molten carbonate fuel cell, a container containing the electrolyte colloidal solution prepared in step 1, a circulating pump, and an anode or cathode outlet of the molten carbonate fuel cell; and initiating the circulation pump to fully circulate the electrolyte colloidal solution in the internal channel of the cell stack, and to allow a part of the electrolyte to adhere to the electrode and the internal channel of the cell stack during a circulation process.

In an embodiment of the present disclosure, discharging the excess electrolyte colloidal solution in the cell stack in step 3 includes:

introducing air or nitrogen with a flow rate of 15% to 30% of a cathode flow rate at full power of the cell stack into the cell stack from a cathode or anode inlet at an upper part of the cell stack, and completely discharging the excess electrolyte colloidal solution in the cell stack from a cathode or anode outlet at a lower part of the cell stack.

In an embodiment of the present disclosure, drying and discharging the water or the organic solvent in the cell stack in step 4 includes introducing nitrogen or carbon dioxide inert gas into the cell stack at a temperature of 66° C. to 80° C. for 24 to 48 hours.

Compared with the related art, beneficial effects of the present disclosure are as follows.

The method for replenishing the electrolyte of the molten carbonate fuel cell stack provided in the present disclosure is capable of adhering the electrolyte uniformly to the electrodes and the channels inside the flow field by taking advantage of the good fluidity and viscosity of the electrolyte colloidal solution, and replenishing the lost electrolyte in the cell stack based on a capillary infiltration principle of the molten electrolyte. This method effectively compensates the decline of the performance and service life of the molten carbonate fuel cell caused by the loss of the electrolyte during high-temperature operation, and has important guiding significance for improving the performance and service life of the stable molten carbonate fuel cell.

Further, the molten carbonate electrolyte is generally in solid, and melted into liquid under high temperature, so as to be sucked into micro-pores of the separator by a capillary force to isolate gases of two electrodes. The solid electrolyte is difficult to be evenly replenished into the cell stack, and may block internal channels of the cell. However, by dispersing the electrolyte with the binder and the solvent into liquid colloid, the electrolyte may be evenly transported to the interior of the cell and evenly distributed in the cell by continuous flow of the circulating pump.

Further, a content of the electrolyte replenished into the cell stack may be adjusted by adjusting a content of the electrolyte in the electrolyte colloid. In addition, the colloidal solution contains a small amount of the binder, and the electrolyte may be evenly dispersed in the colloidal solution, which ensures that the electrolyte is evenly distributed to various parts in the cell stack.

The present disclosure provides a method for replenishing an electrolyte of a molten carbonate fuel cell stack, which includes the following steps.

1) A volume of a flow field and a flow channel in the cell stack is calculated according to a structure of cell stack bipolar plate and cell end plate.

2) An electrolyte colloidal solution is prepared.

A first kind of electrolyte colloidal solution is prepared as follows. Lithium carbonate and sodium carbonate are mixed in a molar ratio of 53:47 to form an electrolyte, and the obtained electrolyte is mixed with an aqueous solution of polyvinyl alcohol with a concentration of 0.5% to 3%, or with a mixed solution of polyvinyl butyral and ethanol with a concentration of 95% to prepare the electrolyte colloidal solution containing 10% to 20% of the electrolyte and having a viscosity of 200 to 800 Pa·s.

A second kind of electrolyte colloidal solution is prepared as follows. Lithium carbonate and potassium carbonate are mixed in a molar ratio of 62:38 to form an electrolyte, and the obtained electrolyte is mixed with an aqueous solution of polyvinyl alcohol with a concentration of 0.5% to 3%, or with a mixed solution of polyvinyl butyral and ethanol to prepare the electrolyte colloidal solution containing 10% to 20% of the electrolyte and having a viscosity of 200 to 800 Pa·s.

The concentration of the mixed solution of polyvinyl butyral and ethanol is in a range of 3% to 5%, and the concentration of the ethanol is 95%.

3) A circulation loop for replenishing the electrolyte is formed by an anode or cathode inlet 3 of the molten carbonate fuel cell 5, a container 1 containing the electrolyte colloidal solution, a circulating pump 2, and an anode or cathode outlet 6 of the molten carbonate fuel cell (MCFC). The circulation pump 2 is initiated to fully circulate the electrolyte colloidal solution in the internal channel of the cell stack for 24 to 48 hours, and ensure that a part of the electrolyte is adhered to the electrode and the internal channel of the cell stack during a circulation process.

4) Air or nitrogen with a flow rate of 15% to 30% of a cathode flow rate at full power of the cell stack is introduced into the cell stack from the cathode or anode inlet at an upper part of the cell stack, and the excess electrolyte colloidal solution in the cell stack is discharged from the cathode or anode outlet at a lower part of the cell stack. The duration of ventilation is 24 to 48 hours, and the air flow rate is controlled to slowly blow the residual colloid out of the cell stack and allow the electrolyte to slowly adhere to walls of components inside the cell stack.

5) Nitrogen or carbon dioxide inert gas is introduced into the cell stack at a temperature of 66° C. to 80° C. for 24 to 48 hours to dry and discharge water or an organic solvent in the cell stack, thereby eliminating the influence of the water and the organic solvent on cell's performance.

After replenishing the electrolyte, the cell stack is heated to 450° C. with a rate of 1° C./1 min to 1° C./3 min and held at this temperature for 5 hours, then is heated to 550° C. with a rate of 1° C./3 min to 1° C./5 min, and then is heated to 650° C. with a rate of 1° C./1 min to 1° C./3 min, and hydrogen was introduced into the anode to reduce the electrode. When the temperature reaches 650° C., air and carbon dioxide are introduced to the cathode to perform a discharge performance test.

The method for replenishing the electrolyte of the molten carbonate fuel cell stack provided in embodiments of the present disclosure has important guiding significance in the research and application fields of MCFC, which will be illustrated in detail with examples as follows.

Example 1

1) A 5 kW molten carbonate fuel cell stack was provided, which has operated for a certain period of time with decreased performance, and is composed of 36 single cells in series. An effective area of the single cell is 2000 cm$^2$.

2) According to a structure of cell stack bipolar plate and cell end plate of the 5 kW MCFC, a volume of a flow field and a flow channel in the cell stack was calculated, which is 0.036 m$^3$. Lithium carbonate and potassium carbonate were mixed in a molar ratio of 62:38 to form an electrolyte, and the obtained electrolyte was mixed with an aqueous solution of polyvinyl alcohol with a concentration of 0.5% under stirring to prepare an electrolyte colloidal solution containing 10% of the electrolyte and having a viscosity of 200 Pa·s. An amount of the electrolyte colloidal solution is 3 times the volume of the flow field and the flow channel in the cell stack.

3) The prepared electrolyte colloidal solution was put into a closed container with an inlet and an outlet. A circulation loop for replenishing the electrolyte was formed by connecting the inlet and outlet of the container, the cell stack and a circulating pump. The circulation pump was initiated to fully circulate the electrolyte colloidal solution in the internal channel of the cell stack for 24 hours, and after the circulation was stopped, the electrolyte colloidal solution in the cell stack was discharged from a bottom of the cell stack.

4) Air or nitrogen with 15% of a cathode flow rate at full power of the cell stack was introduced into the cell stack from an upper part of the cell stack for 24 hours to discharge the excess electrolyte colloidal solution in the cell stack again.

5) Nitrogen or carbon dioxide inert gas with 25% of the cathode flow rate at the full power of the cell stack was introduced into the cell stack at a temperature of 80° C. for 30 hours to dry and discharge water or the organic solvent in the cell stack to complete replenishment of the electrolyte.

Afterwards, the cell stack was heated to 450° C. with a rate of 1° C./3 min and held at this temperature for 5 hours, then was heated to 550° C. with a rate of 1° C./3 min, and then was heated to 650° C. with a rate of 1° C./1 min, and hydrogen was introduced into the anode to reduce the electrode. When the temperature reached 650° C., air and carbon dioxide were introduced to the cathode to perform a discharge performance test.

Example 2

This example is the same as example 1, but the difference lies in that the electrolyte colloidal solution was prepared as follows.

Lithium carbonate and potassium carbonate were mixed in a molar ratio of 62:38 to form an electrolyte, and the obtained electrolyte was mixed with an aqueous solution of polyvinyl alcohol with a concentration of 1.5% under stirring to prepare the electrolyte colloidal solution containing 15% of the electrolyte and having a viscosity of 200 Pa·s.

Example 3

This example is the same as example 1, but the difference lies in that the electrolyte colloidal solution was prepared as follows.

Lithium carbonate and potassium carbonate were mixed in a molar ratio of 62:38 to form an electrolyte, and the obtained electrolyte was mixed with an aqueous solution of polyvinyl alcohol with a concentration of 3% under stirring to prepare the electrolyte colloidal solution containing 20% of the electrolyte and having a viscosity of 200 Pa·s.

Example 4

This example is the same as example 1, but the difference lies in that the electrolyte colloidal solution was prepared as follows.

Lithium carbonate and potassium carbonate were mixed in a molar ratio of 62:38 to form an electrolyte, and the obtained electrolyte was mixed with a mixed solution of polyvinyl butyral and ethanol with a concentration of 95% under stirring to prepare the electrolyte colloidal solution containing 20% of the electrolyte and having a viscosity of 200 Pa·s.

Example 5

This example is the same as example 1, but the difference lies in that the electrolyte colloidal solution was prepared as follows.

Lithium carbonate and potassium carbonate were mixed in a molar ratio of 62:38 to form an electrolyte, and the obtained electrolyte was mixed with a mixed solution of polyvinyl butyral and ethanol with a concentration of 95% under stirring to prepare the electrolyte colloidal solution containing 10% of the electrolyte and having a viscosity of 200 Pa·s.

Example 6

This example is the same as example 1, but the difference lies in that the electrolyte colloidal solution was prepared as follows.

Lithium carbonate and potassium carbonate were mixed in a molar ratio of 62:38 to form an electrolyte, and the obtained electrolyte was mixed with a mixed solution of polyvinyl butyral and ethanol with a concentration of 95% under stirring to prepare the electrolyte colloidal solution containing 13% of the electrolyte and having a viscosity of 200 Pa·s.

Example 7

This example is the same as example 1, but the difference lies in that the electrolyte colloidal solution was prepared as follows.

Lithium carbonate and sodium carbonate were mixed in a molar ratio of 53:47 to form an electrolyte, and the obtained electrolyte was mixed with an aqueous solution of polyvinyl alcohol with a concentration of 1.5% under stirring to prepare the electrolyte colloidal solution containing 15% of the electrolyte and having a viscosity of 200 Pa·s.

Example 8

This example is the same as example 1, but the difference lies in that the electrolyte colloidal solution was prepared as follows.

Lithium carbonate and sodium carbonate were mixed in a molar ratio of 53:47 to form an electrolyte, and the obtained electrolyte was mixed with an aqueous solution of polyvinyl alcohol with a concentration of 3% under stirring to prepare the electrolyte colloidal solution containing 20% of the electrolyte and having a viscosity of 200 Pa·s.

Example 9

This example is the same as example 1, but the difference lies in that the electrolyte colloidal solution was prepared as follows.

Lithium carbonate and sodium carbonate were mixed in a molar ratio of 53:47 to form an electrolyte, and the obtained electrolyte was mixed with a mixed solution of polyvinyl butyral and ethanol with a concentration of 95% under stirring to prepare the electrolyte colloidal solution containing 20% of the electrolyte and having a viscosity of 200 Pa·s.

Example 10

This example is the same as example 1, but the difference lies in that the electrolyte colloidal solution was prepared as follows.

Lithium carbonate and sodium carbonate were mixed in a molar ratio of 53:47 to form an electrolyte, and the obtained electrolyte was mixed with a mixed solution of polyvinyl butyral and ethanol with a concentration of 95% under stirring to prepare the electrolyte colloidal solution containing 10% of the electrolyte and having a viscosity of 200 Pa·s.

Example 11

This example is the same as example 1, but the difference lies in that the electrolyte colloidal solution was prepared as follows.

Lithium carbonate and sodium carbonate were mixed in a molar ratio of 53:47 to form an electrolyte, and the obtained electrolyte was mixed with a mixed solution of polyvinyl butyral and ethanol with a concentration of 95% under stirring to prepare the electrolyte colloidal solution containing 13% of the electrolyte and having a viscosity of 200 Pa·s.

Example 12

This example is the same as example 1, but the difference lies in that the electrolyte colloidal solution was prepared as follows.

Lithium carbonate and sodium carbonate were mixed in a molar ratio of 53:47 to form an electrolyte, and the obtained electrolyte was mixed with an aqueous solution of polyvinyl alcohol with a concentration of 0.5% under stirring to prepare the electrolyte colloidal solution containing 13% of the electrolyte and having a viscosity of 200 Pa·s.

What is claimed is:

1. A method for replenishing an electrolyte of a molten carbonate fuel cell stack, comprising:
   step 1: preparing an electrolyte colloidal solution containing 10 wt % to 20 wt % of the electrolyte and having a viscosity of 200 to 800 Pa·s;
   step 2: replenishing the electrolyte of the cell stack using the electrolyte colloidal solution prepared in step 1 to allow the electrolyte to adhere to an electrode and an internal channel of the cell stack;
   step 3: discharging excess electrolyte colloidal solution in the cell stack; and
   step 4: drying and discharging water or an organic solvent in the cell stack under an inert gas condition to complete replenishment of the electrolyte of the cell stack, and performing a discharge performance test.

2. The method for replenishing the electrolyte of the molten carbonate fuel cell stack according to claim 1, wherein the electrolyte colloidal solution in step 1 is prepared by:
   mixing lithium carbonate and potassium carbonate in a molar ratio of 62:38 to form the electrolyte; and
   mixing the obtained electrolyte with an aqueous solution of polyvinyl alcohol with a concentration of 0.5 wt % to 3 wt %, or with a mixed solution of polyvinyl butyral and ethanol with a concentration of 95 wt % to prepare the electrolyte colloidal solution containing 10 wt % to 20 wt % of the electrolyte and having the viscosity of 200 to 800 Pa·s.

3. The method for replenishing the electrolyte of the molten carbonate fuel cell stack according to claim 1, wherein the electrolyte colloidal solution in step 1 is prepared by:
   mixing lithium carbonate and sodium carbonate in a molar ratio of 53:47 to form the electrolyte; and
   mixing the obtained electrolyte with an aqueous solution of polyvinyl alcohol with a concentration of 0.5 wt % to 3 wt %, or with a mixed solution of polyvinyl butyral and ethanol with a concentration of 95 wt % to prepare the electrolyte colloidal solution containing 10 wt % to 20 wt % of the electrolyte and having the viscosity of 200 to 800 Pa·s.

4. The method for replenishing the electrolyte of the molten carbonate fuel cell stack according to claim 1, wherein in step 2, replenishing the electrolyte of the cell stack using the electrolyte colloidal solution prepared in step 1 comprises:
   forming a circulation loop for replenishing the electrolyte by an anode or cathode inlet of the molten carbonate fuel cell, a container containing the electrolyte colloidal solution prepared in step 1, a circulating pump, and an anode or cathode outlet of the molten carbonate fuel cell; and
   initiating the circulation pump to fully circulate the electrolyte colloidal solution in the internal channel of the cell stack, and to allow a part of the electrolyte to adhere to the electrode and the internal channel of the cell stack during a circulation process.

5. The method for replenishing the electrolyte of the molten carbonate fuel cell stack according to claim 1, wherein discharging the excess electrolyte colloidal solution in the cell stack in step 3 comprises:

introducing air or nitrogen with a flow rate of 15% to 30% in volume of a cathode flow rate at full power of the cell stack into the cell stack from a cathode or anode inlet at an upper part of the cell stack, and completely discharging the excess electrolyte colloidal solution in the cell stack from a cathode or anode outlet at a lower part of the cell stack.

6. The method for replenishing the electrolyte of the molten carbonate fuel cell stack according to claim 1, wherein drying and discharging the water or the organic solvent in the cell stack in step 4 comprises:

introducing nitrogen or carbon dioxide inert gas into the cell stack at a temperature of 66° C. to 80° C. for 24 to 48 hours.

* * * * *